(12) United States Patent
El-Sadi

(10) Patent No.: US 7,327,103 B1
(45) Date of Patent: Feb. 5, 2008

(54) DRIVER AND METHOD FOR CONTROL OF VOICE COIL MOTOR IN DISK DRIVE

(75) Inventor: Ashraf El-Sadi, Union City, CA (US)

(73) Assignee: Maxtor Corporation, Scotts Valley, CA (US)

( * ) Notice: Subject to any disclaimer, the term of this patent is extended or adjusted under 35 U.S.C. 154(b) by 184 days.

(21) Appl. No.: 09/943,705

(22) Filed: Aug. 31, 2001

(51) Int. Cl.
  *H02P 1/34* (2006.01)

(52) U.S. Cl. .......... 318/34; 318/254; 318/678; 318/560; 318/632; 360/75; 360/67; 360/78.09

(58) Field of Classification Search .......... 318/34, 318/254, 439, 786, 109, 560, 561, 139, 569, 318/138, 599; 360/78, 46, 77, 73
See application file for complete search history.

(56) References Cited

U.S. PATENT DOCUMENTS

| | | | |
|---|---|---|---|
| 3,936,876 A * | 2/1976 | Taylor | 360/78.07 |
| 4,422,027 A * | 12/1983 | Mohlere | 318/625 |
| 4,885,517 A * | 12/1989 | Pennock | 318/678 |
| 5,191,297 A * | 3/1993 | Penman et al. | 330/146 |
| 5,270,882 A * | 12/1993 | Jove et al. | 360/67 |
| 5,299,075 A * | 3/1994 | Hanks | 360/77.02 |
| 5,426,545 A * | 6/1995 | Sidman et al. | 360/78.09 |
| 5,465,035 A * | 11/1995 | Scaramuzzo et al. | 318/561 |
| 5,491,394 A * | 2/1996 | Harwood et al. | 318/563 |
| 5,523,911 A | 6/1996 | Mita et al. | 360/106 |
| 5,731,935 A * | 3/1998 | Lian et al. | 360/291 |
| 5,821,717 A * | 10/1998 | Hassan et al. | 318/138 |
| 5,838,515 A * | 11/1998 | Mortazavi et al. | 360/75 |
| 5,859,518 A * | 1/1999 | Vitunic | 318/701 |
| 5,959,808 A | 9/1999 | Fan et al. | |
| 6,023,143 A * | 2/2000 | Salina et al. | 318/599 |
| 6,088,185 A * | 7/2000 | Ratliff et al. | 360/77.03 |
| 6,094,020 A | 7/2000 | Goretzki et al. | |
| 6,104,581 A | 8/2000 | Huang et al. | |
| 6,122,135 A | 9/2000 | Stich | |
| 6,122,139 A | 9/2000 | Sri-Jayantha et al. | |
| 6,134,071 A | 10/2000 | Andoh et al. | |
| 6,140,784 A * | 10/2000 | Mazda | 318/280 |
| 6,196,047 B1 | 3/2001 | Carnegie et al. | |
| 6,198,583 B1 | 3/2001 | Ohinata et al. | |
| 6,229,273 B1 * | 5/2001 | Kelly et al. | 318/254 |
| 6,300,937 B1 * | 10/2001 | Rosenberg | 345/156 |
| 6,353,298 B1 * | 3/2002 | Jeffrey | 318/293 |
| 6,388,413 B1 * | 5/2002 | Ng et al. | 318/560 |
| 6,420,910 B1 * | 7/2002 | Contreras et al. | 327/77 |
| 6,445,530 B1 * | 9/2002 | Baker | 360/78.04 |
| 6,462,496 B1 * | 10/2002 | Hassan et al. | 318/560 |
| 6,473,251 B2 * | 10/2002 | Patti et al. | 360/25 |
| 6,479,954 B1 * | 11/2002 | Peritore et al. | 318/254 |
| 6,549,590 B2 * | 4/2003 | Myers et al. | 375/344 |
| 6,600,618 B2 * | 7/2003 | Schlager | 360/75 |

(Continued)

*Primary Examiner*—Lincoln Donovan
*Assistant Examiner*—Renata McCloud
(74) *Attorney, Agent, or Firm*—Derek J. Berger

(57) ABSTRACT

A driver for a voice coil motor in a disk drive includes a sensor that provides a sense current by sensing a coil current in the voice coil motor, a comparator that provides an error current by determining a difference between a command current and the sense current, an integrator that provides an integrated error current by integrating the error current, and an amplifier that provides the coil current by amplifying the integrated error current.

100 Claims, 4 Drawing Sheets

U.S. PATENT DOCUMENTS 6,710,965 B2 * 3/2004 Ding et al. ............... 360/77.02
6,747,836 B2 * 6/2004 Stevens et al. .......... 360/78.05
6,826,007 B1 * 11/2004 Patton, III ............... 360/78.06

* cited by examiner

DRIVER AND METHOD FOR CONTROL OF VOICE COIL MOTOR IN DISK DRIVE

BACKGROUND OF THE INVENTION

1. Field of the Invention

The present invention relates to disk drives, and more particularly, to a driver and method for controlling a voice coil motor in a disk drive.

2. Discussion of the Related Art

Disk drive 10 includes head 12, disk 14, spindle motor 16, preamplifier 18, channel 20, microprocessor 22, digital-to-analog converter (DAC) 24, driver 26 and actuator assembly 28 that includes voice coil motor (VCM) 30 and actuator arm 32. Furthermore, VCM 30 includes coil 34 and permanent magnet 36.

Head 12 is a transducer that reads data from and writes data to disk 14. Head 12 is attached to or formed integrally with a slider. Disk 14 is a magnetic storage medium that stores data in concentric tracks. Spindle motor 16 rotates disk 14 so that head 12 is supported by a cushion of air (air bearing) at a flying height in close proximity to disk 14.

Preamplifier 18 amplifies analog read signals from head 12 and passes the read signals to channel 20, and channel 20 demodulates the read signals and sends digital signals to microprocessor 22. Microprocessor 22 sends a digital command signal to DAC 24, which transforms the digital command signal into an analog command signal, and driver 26 receives the analog command signal and sends a coil current to VCM 30.

VCM 30 is coupled to actuator arm 32, which is a suspension that supports head 12. VCM 30 rotates actuator arm 32 about a pivot point to move head 12 radially across disk 14 to selected tracks during seek operations, and maintains head 12 above selected tracks during track following operations.

VCM 30 is a fast response, direct current, pure torque motor that includes top and bottom plates (not shown) and coil 34 and permanent magnet 36 therebetween. The coil current passes through coil 34 to generate a magnetic field that interacts with the magnetic field of permanent magnet 36 to create torque that rotates actuator arm 32 and positions head 12. Coil 34 is a stacked coil with two coils stacked relative to one another. When the coil current passes through the coils in the same direction the coils generate forces in opposite rotational directions that cancel each other and no torque is generated, and when the coil current passes through the coils in opposite directions the coils generate forces in the same rotational direction that supplement one another and torque is generated. In addition, mechanical disturbance forces are balanced so that the coil current puts electrical energy into coil 34 that creates desired motion without wasting moment (pure torque).

Disk drive 10 receives read and write commands from a host computer (not shown), and in response, performs read and write operations in which head 12 accesses different tracks on disk 14. The read and write operations include servo operations which include seek and track following operations. During a servo operation, microprocessor 22 receives servo position information from head 12, implements a servo control program by executing an estimator control loop program, and commands driver 26 to send a coil current to VCM 30 to accurately position head 12 over the selected track in as short a time as possible to enable the data transfer between head 12 and disk 14.

Disk drive 10 increases its storage capacity by reducing the flying height of head 12 and by reducing the track spacing on disk 14. Reduced flying height increases the bits-per inch (BPI) on disk 14, and reduced track spacing increases the tracks-per-inch (TPI) on disk 14. However, actuator assembly 28 is a non-rigid structure that exhibits mild vibration at resonant frequencies during the seek and track following operations. As a result, actuator assembly 28 creates mechanical disturbance that can degrade the performance of disk drive 10 as the flying height and the track spacing are reduced. For instance, at low flying height the mechanical disturbance can cause head 12 to contact disk 14, thereby damaging head 12 as it sticks to varnish on disk 14 and ruining data at the contact point on disk 14. Likewise, at high TPI the mechanical disturbance can limit the servo bandwidth due to poor frequency response at the lowest resonant frequencies.

Actuator assemblies have been designed with secondary motors that position the head relative to the disk and reduce the mechanical disturbance. However, dual-stage actuators require more space in the disk drive.

There is therefore a need for improved position control of a head in a disk drive.

SUMMARY OF THE INVENTION

The present invention provides a driver for a voice coil motor in a disk drive.

The driver includes a sensor that provides a sense current by sensing a coil current in the voice coil motor, a comparator that provides an error current by determining a difference between a command current and the sense current, an integrator that provides an integrated error current by integrating the error current, and an amplifier that provides the coil current by amplifying the integrated error current.

In an embodiment, the sensor includes a sense resistor that provides a sense voltage in response to the coil current and a transconductance amplifier that provides the sense current in response to the sense voltage. The integrator includes a capacitor coupled to a node between the comparator and the amplifier. The coil includes first and second coils and a center tap therebetween. The amplifier includes first and second amplifiers, the first amplifier is coupled to the first coil, the second amplifier is coupled to the second coil, the first amplifier is coupled to the second coil and the center tap through the first coil, and the second amplifier is coupled to the first coil and the center tap through the second coil. The driver also includes first and second transistors coupled to the center tap and coupled to the first and second coils through the center tap.

In another embodiment, the first amplifier is coupled to the first coil by a first terminal, the second amplifier is coupled to the second coil by a second terminal, the first and second transistors are coupled to the center tap by a third terminal, and an interface between the driver and the voice coil motor consists of the first, second and third terminals.

In another embodiment, the first and second amplifiers provide the coil current through the first and second coils in series, the first and second transistors are turned off and the center tap floats and in response a track following operation.

In another embodiment, the first transistor sends the coil current through the center tap in a first direction, sends a first portion of the coil current through the first coil and sends a second portion of the coil current through the second coil, and the first and second amplifiers and the second transistor are turned off in response to a first seek operation that moves the head across the disk in a first radial direction, and the second transistor sends the coil current through the center tap in a second direction opposite the first direction, sends a first portion of the coil current through the first coil and sends a second portion of the coil current through the second coil, and the first and second amplifiers and the first transistor are turned off in response to a second seek operation that moves the head across the disk in a second radial direction opposite the first radial direction.

It is understood that both the foregoing general description and the following detailed description are exemplary and explanatory and are intended to provide further explanation of the invention as claimed.

BRIEF DESCRIPTION OF THE DRAWINGS

The accompanying drawings provide further understanding of the invention and together with the detailed description serve to explain the principles of the invention.

DETAILED DESCRIPTION OF THE PREFERRED EMBODIMENTS

Reference will now be made to the preferred embodiments of the present invention, examples of which are illustrated in detail with the accompanying drawings.

Figure 1:
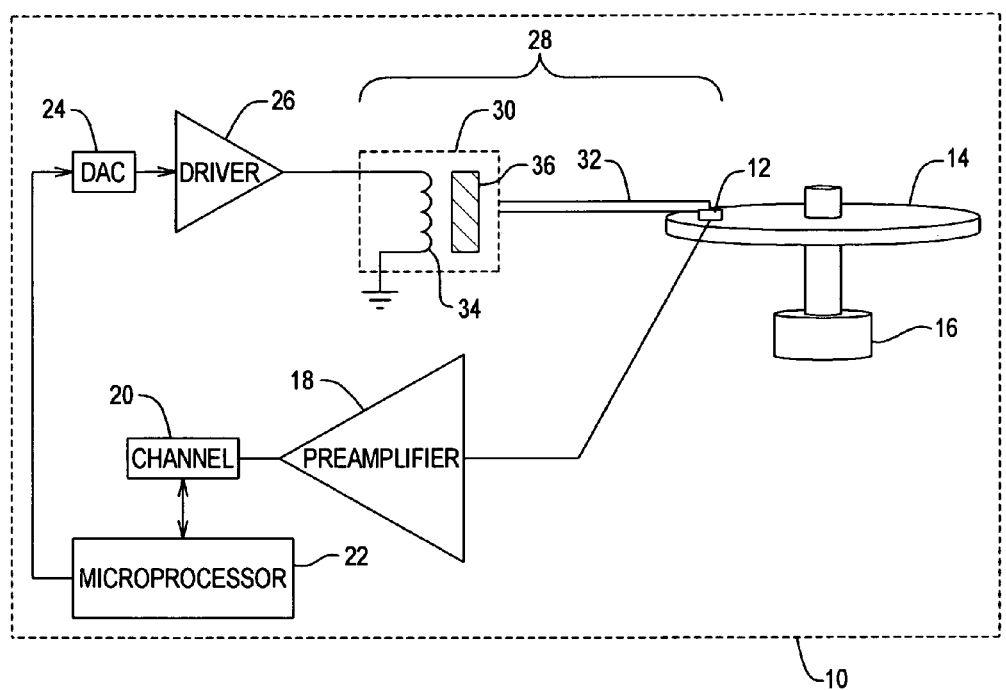
FIG. 1 illustrates a disk drive that includes a driver and a voice coil motor.
Figure 2:
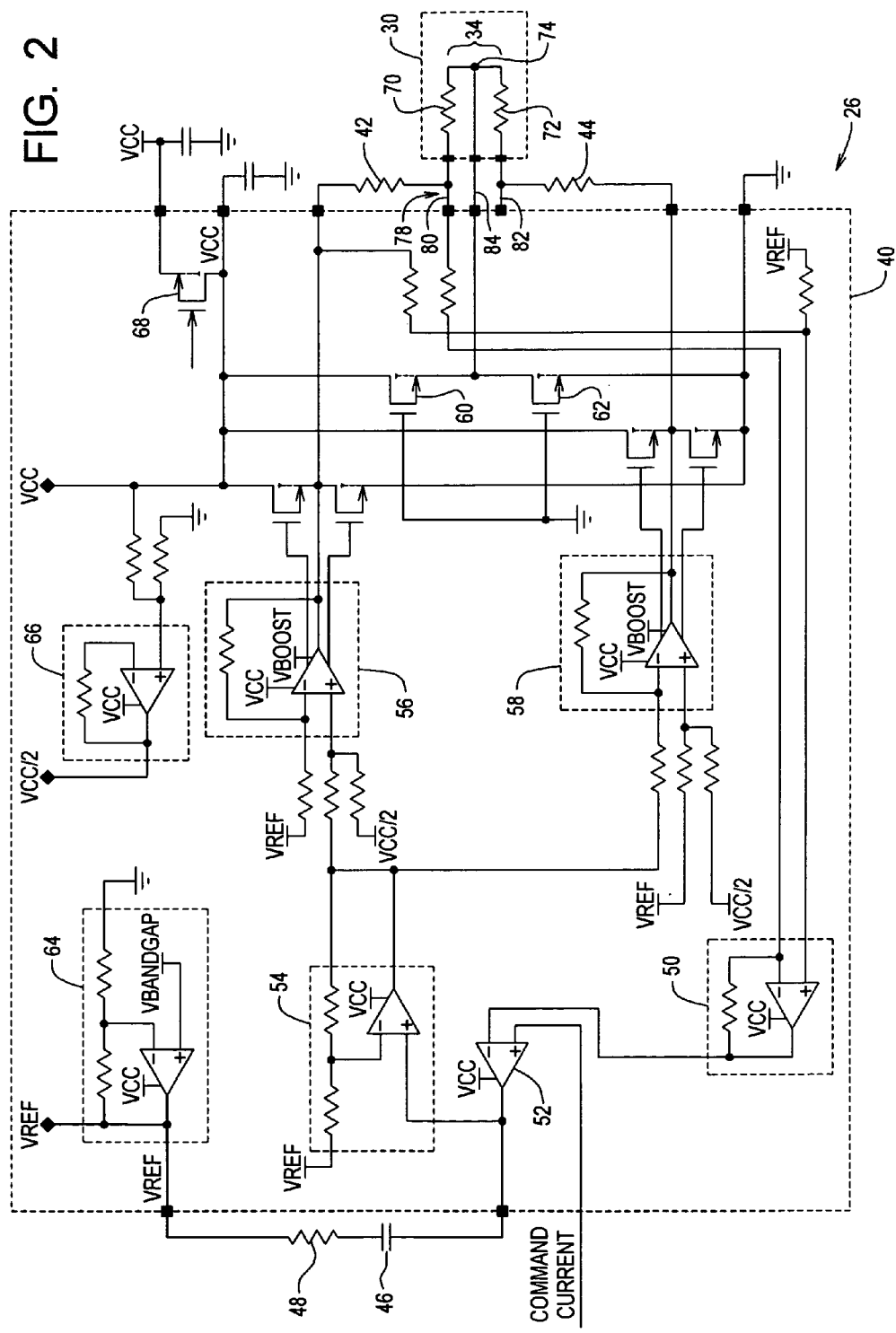
FIG. 2 illustrates the driver and the voice coil motor driver during a track following operation in accordance with an embodiment of the present invention.

FIG. 2 shows driver 26 and VCM 30 during a track following operation in accordance with an embodiment of the present invention.

Driver 26 includes power chip 40, sense resistors 42 and 44, capacitor 46 and phase resistor 48. Power chip 40 is an integrated circuit (IC) located on a printed circuit board (not shown) in disk drive 10, and resistors 42, 44 and 48 and capacitor 46 are discreet components external to power chip 40.

Driver 26 also includes, within power chip 40, transconductance amplifier 50, comparator 52, error buffer 54, amplifiers 56 and 58, transistors 60 and 62, reference voltage generator 64, voltage shifter 66 and switch 68. Transconductance amplifier 50 is a voltage-to-current converter. Comparator 52 provides an error current based on the difference between the input currents. Error buffer 54 provides a buffer amplifier between capacitor 46 and comparator 52 at the input and amplifiers 56 and 58 at the output. Amplifiers 56 and 58 provide the coil current during selected operations. Transistors 60 and 62 are DMOS transistors that provide the coil current during selected operations. Reference voltage generator 64 generates a reference voltage (Vref) based on a supply voltage (Vcc) from an external power supply. Voltage shifter 66 generates half the supply voltage (Vcc/2) based on the supply voltage. Switch 68 connects driver 26 to the power supply when the supply voltage is present during normal operation of disk drive 10 that includes seek and track following operations and disconnects driver 26 from the power supply when the supply voltage is absent.

VCM 30 includes coil 34 which includes coils 70 and 72 and center tap 74. Coils 70 and 72 are separate stacked coil windings that provide separate motors and generate separate magnetic fields in response to the coil current to create separate rotational forces within VCM 30. Coils 70 and 72 are coupled at center tap 74.

Interface 76 is located between driver 26 and VCM 30 and consists of terminals 80, 82 and 84. Amplifier 56 is coupled to terminal 80 by sense resistor 42, amplifier 58 is coupled to terminal 82 by sense resistor 44, and transistors 60 and 62 are directly connected to terminal 84. Likewise, amplifier 56 is coupled to coil 70 by terminal 80, amplifier 58 is coupled to coil 72 by terminal 82, and transistors 60 and 62 are coupled to center tap 74 by terminal 84. Furthermore, amplifier 56 is coupled to coil 72 and center tap 74 by coil 70, amplifier 58 is coupled to coil 70 and center tap 74 by coil 72, and transistors 60 and 62 are coupled to coils 70 and 72 by center tap 74. Advantageously, interface 80 is a three-terminal interface rather than a four-terminal interface, as is conventional for VCMs with dual coils.

Amplifiers 56 and 58 provide the coil current through coils 70 and 72 during the track following operation. In particular, amplifiers 56 and 58 operate as a class AB amplifier, transistors 60 and 62 are turned off (the gates are coupled to ground), the coil current flows through coils 70 and 72 in series and center tap 74 floats. Driver 26 provides the coil current through coil 34 as though it is a single coil without a center tap, coils 70 and 72 provide opposing rotational forces in opposite rotational directions and head 12 is maintained over the selected track on disk 14.

Driver 26 provides the coil current as an approximation of the command current received from microprocessor 22 via DAC 24 during the track following operation. The coil current flows through sense resistors 42 and 44, coils 70 and 72 and terminals 82 and 82 in series. Sense resistors 42 and 44 have low resistance and therefore little affect on the coil current. Sense resistor 42 provides a sense voltage that corresponds to the coil current, and transconductance amplifier 50 converts the sense voltage into a sense current which corresponds to the coil current. Comparator 52 provides an error current as the difference between the command current and the sense current. Capacitor 46 integrates the error current to provide an integrated error current. Phase resistor 48 provides phase lead in the integrated error current. Error buffer 54 provides the integrated error current to amplifiers 56 and 58, and amplifiers 56 and 58 amplify the integrated error current to provide the coil current to VCM 30.

Driver 26 implements a current feedback loop that adjusts the coil current in response to the difference (error) between the coil current and the command current so that the coil current is about equal to the command current. Advantageously, integrating the error current increases gain in the current feedback loop and reduces steady state error in the current feedback loop. Moreover, introducing phase shift in the integrated error current offsets or cancels phase shift due to a motor electrical time constant of VCM 30. In this manner, capacitor 46 and phase resistor 48 provide a dynamic compensator in which capacitor 46 functions as an integrator and resistor 48 functions as a phase corrector. The dynamic compensator provides the current feedback loop with increased bandwidth to improve track following. For example, the current feedback loop has a bandwidth from about 20 kHz to 30 kHz to provide the necessary transient response.

Figure 3:
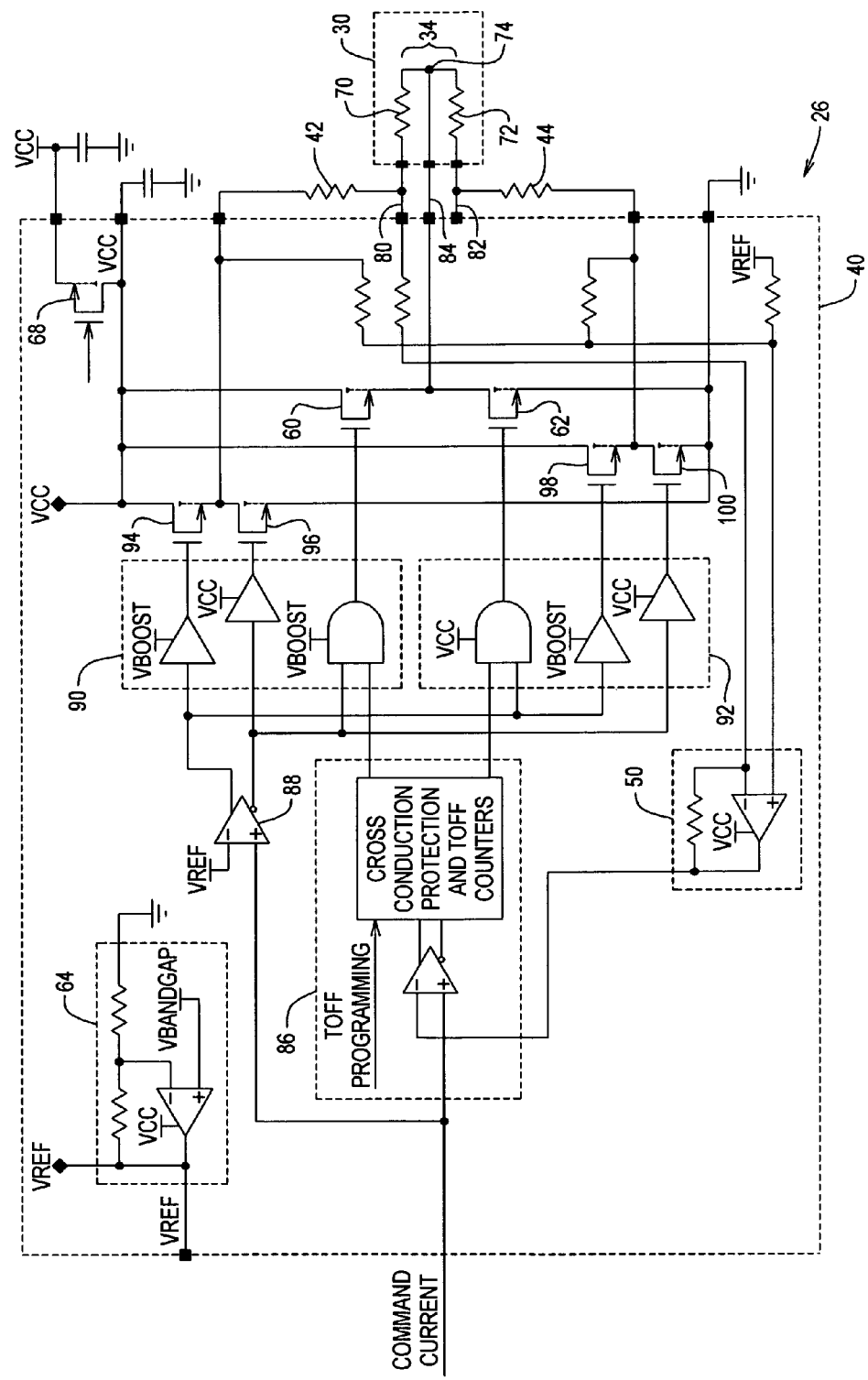
FIG. 3 illustrates the driver and the voice coil motor driver during a seek operation in accordance with an embodiment of the present invention.

FIG. 3 shows driver 26 and VCM 30 during a seek operation in accordance with an embodiment of the present invention.

Driver 26 also includes, within power chip 40, programmable comparator 86, polarity comparator 88, predriver logic circuits 90 and 92 and transistors 94, 96, 98 and 100. Programmable comparator 86 provides control signals based on a comparison between the command current and the sense current as well as time off (Toff) programming. Polarity comparator 88 provides control signals based on the polarity of the command current. Predriver logic circuit 90 enables and disables (turns on and off) transistors 60, 94 and 96 based on the control signals from comparators 86 and 88, and predriver logic circuit 92 enables and disables (turns on and off) transistors 62, 98 and 100 based on the control signals from comparators 86 and 88.

Transistors 94 and 96 are coupled to terminal 80 by sense resistor 42, and transistors 98 and 100 are coupled to terminal 82 by sense resistor 44. Likewise, transistors 94 and 96 are coupled to coil 70 by terminal 80, and transistors 98 and 100 are coupled to coil 72 by terminal 82. Furthermore, transistors 94 and 96 are coupled to coil 72 and center tap 74 by coil 70, and transistors 98 and 100 are coupled to coil 70 and center tap 74 by coil 72.

Transistors 60, 62, 94, 96, 98 and 100 provide the coil current through coils 70 and 72 during seek operations. In particular, transistors 60, 96 and 100 are turned on, amplifiers 56 and 58 and transistors 62, 94 and 98 are turned off and the coil current flows through center tap 74 and flows in parallel through and is divided approximately equally between coils 70 and 72 during a seek operation in which head 12 moves across disk 14 in a first radial direction. Likewise, transistors 62, 94 and 98 are turned on, amplifiers 56 and 58 and transistors 60, 96 and 100 are turned off and the coil current flows through center tap 74 and flows in parallel through and is divided approximately equally between coils 70 and 72 during a seek operation in which head 12 moves across disk 14 in a second radial direction. Driver 26 provides the coil current through coil 34 and center tap 74, about one-half the coil current through coil 70 and about one-half the coil current through coil 72, coils 70 and 72 provide additive rotational forces in the same rotational direction and head 12 moves across disk 14 to the selected track during seek operations in both radial directions.

Driver 26 provides the coil current based on the command current received from microprocessor 22 via DAC 24 during the seek operation. The coil current flows through center tap 74 and terminal 84, at which point it is divided into a first portion (about one-half the coil current) that flows through sense resistor 42, coil 70 and terminal 80 in series and a second portion (about one-half the coil current) that flows through sense resistor 44, coil 72 and terminal 82 in series. Sense resistors 42 and 44 provide a sense voltage that corresponds to the coil current, and transconductance amplifier 50 converts the sense voltage into a sense current which corresponds to the coil current.

Programmable comparator 86 provides high (asserted or logical "one") control signals to predriver logic circuits 90 and 92 until the sense current reaches the command current, and then programmable comparator 86 provides low (deasserted or logical "zero") control signals and activates the Toff counters set by the Toff programming so that the control signals remain low until the Toff period expires. Thereafter, the cycle repeats itself. Thus, programmable comparator 86 drives transistors 60 and 62 into saturation with pulse width modulation (PWM) independently of the integrated error current, and the PWM has a duty cycle that is active based on the magnitude of the coil current relative to the command current and is inactive based on the predetermined Toff period.

Polarity comparator 88 compares the command current with the reference voltage to determine the polarity of the command current, which indicates the radial direction of the seek operation, and provides control signals to predriver logic circuits 90 and 92 based on the polarity of the command current. Polarity comparator 88 provides a high control signal that turns on transistors 60, 96 and 100 and a low control signal that turns off transistors 62, 94 and 98 if the command current is less than the reference voltage and therefore indicates that the seek operation occurs in the first radial direction, and polarity comparator 88 provides a low control signal that turns off transistors 60, 96 and 100 and a high control signal that turns on transistors 62, 94 and 98 if the command current is greater than the reference voltage and therefore indicates that the seek operation occurs in the second radial direction.

Predriver logic circuit 90 includes an AND gate that turns on transistor 60 if the control signals from comparators 86 and 88 are high, and predriver logic circuit 92 includes an AND gate that turns on transistor 62 if the control signals from comparators 86 and 88 are high.

During a seek operation in the first radial direction, comparators 86 and 88 send control signals that command predriver logic circuit 90 to turn on transistors 60 and 96 and turn off transistor 94, and command predriver logic circuit 92 to turn off transistors 62 and 98 and turn on transistor 100. As a result, transistor 60 sources the coil current from the power supply through center tap 74, the first portion of the coil current flows in series through coil 70, sense resistor 42 and transistor 96 to ground, and the second portion of the coil current flows in series through coil 72, sense resistor 44 and transistor 100 to ground.

During a seek operation in the second radial direction, comparators 86 and 88 send control signals that command predriver logic circuit 90 to turn off transistors 60 and 96 and turn on transistor 94, and command predriver logic circuit 92 to turn on transistors 62 and 98 and turn off transistor 100. As a result, transistor 94 sources the first portion of the coil current from the power supply through sense resistor 42 and coil 70 to center tap 74, transistor 98 sources the second portion of the coil current from the power supply through sense resistor 44 and coil 72 to center tap 74, and the coil current flows in series through center tap 74 and transistor 62 to ground.

Driver 26 functions as a bipolar peak current switch driver with constant off-time during seek operations. Driver 26 reduces power consumption in power chip 40 by operating transistors 60 and 62 as saturated bore transistors, thereby reducing temperature rise in power chip 40. This permits microprocessor 22 to waveform shape the command current to eliminate acoustic noise during seek operations even though the waveform shaping increases power consumption and temperature rise in power chip 40.

Figure 4:
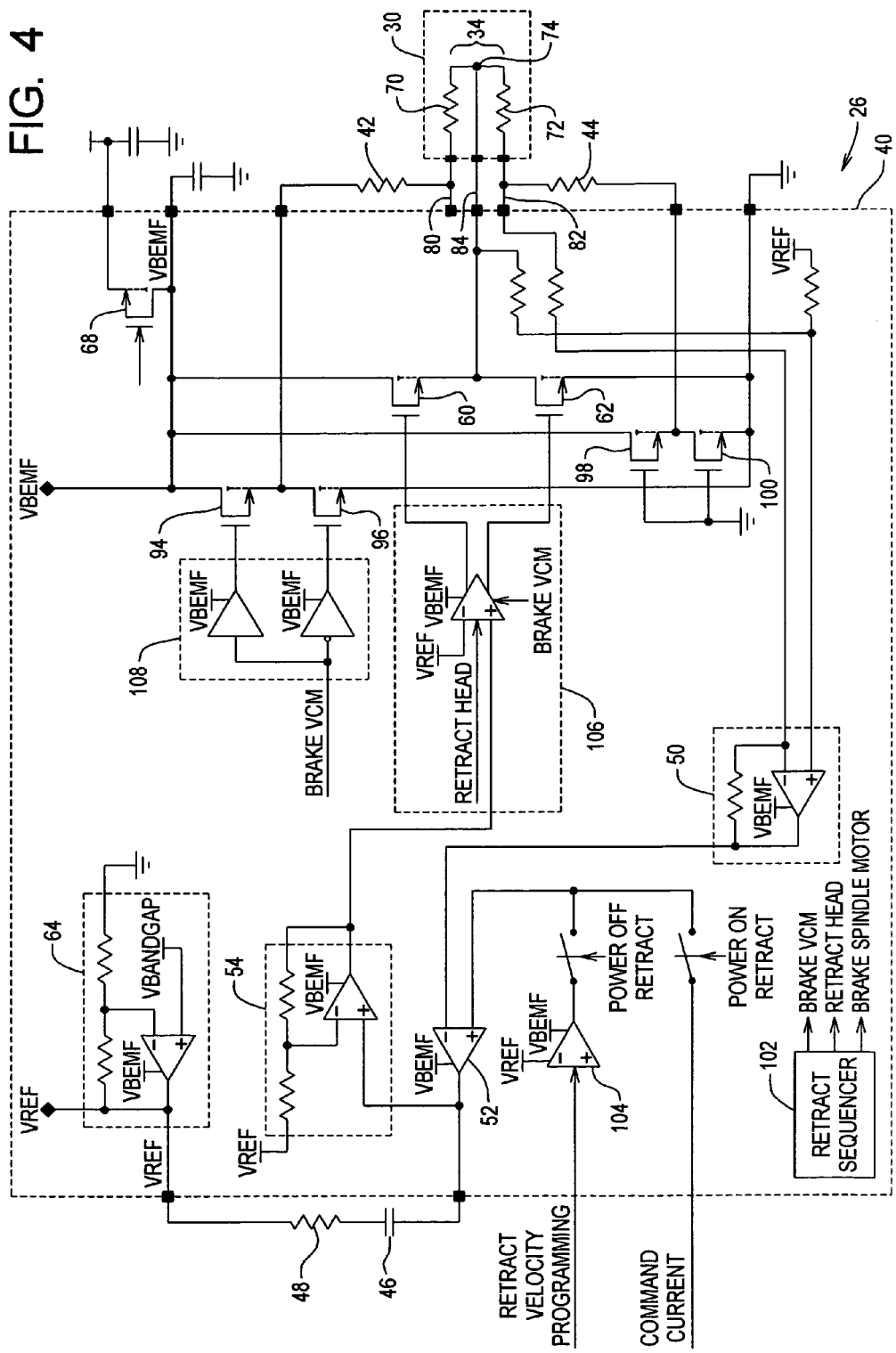
FIG. 4 illustrates the driver and the voice coil motor during a retract operation in accordance with an embodiment of the present invention.

FIG. 4 shows driver 26 and voice coil motor 30 during a retract operation in accordance with an embodiment of the present invention.

Disk drive 10 retracts head 12 from disk 14 and loads head 12 on a ramp (not shown) during the retract operation. Disk drive 10 performs the retract operation as it powers down so that head 12 remains parked on the ramp until power is restored. Furthermore, since the supply voltage is absent, switch 68 disconnects driver 26 from the power supply, and driver 26 uses rectified back electromagnetic force (BEMF) voltage from spindle motor 16 to perform the retract operation.

Driver 26 also includes, within power chip 40, retract sequencer 102, reference retract velocity generator 104, amplifier 106 and predriver logic circuit 108. Retract sequencer 102 provides control signals that retract head 12, brake spindle motor 16 and brake VCM 30 in response to detecting the supply voltage is absent. Reference retract velocity generator 104 provides a reference retract velocity for moving head 12 from disk 14 to the ramp during the retract operation based on retract velocity programming. Amplifier 106 operates transistors 60 and 62 to control the coil current in order to increase the retract velocity, decrease the retract velocity or set the retract velocity to the reference retract velocity based on the retract head control signal, the brake VCM control signal and the integrated error current. Predriver logic circuit 108 controls transistors 94 and 96 in response to the brake VCM control signal, and transistors 98 and 100 have their gates coupled to ground.

Driver 26 operates during the retract operation in several respects like the track following operation. The coil current flows through coil 34 and sense resistors 42 and 44, sense resistors 42 and 44 provide a sense voltage that corresponds to the coil current, transconductance amplifier 50 converts the sense voltage into a sense current, comparator 52 provides an error current as the difference between the command current and the sense current, capacitor 46 integrates the error current to provide an integrated error current, phase resistor 48 phase shifts the integrated error current and the coil current is adjusted based on the integrated error current using a current feedback loop. However, during the retract operation, the command current specifies the retract velocity, and driver 26 provides the coil current as an approximation of the command current to achieve the retract velocity.

Driver 26 operates during the retract operation in other respects like the seek operation. Retract sequencer 102 sends control signals to amplifier 106 and predriver logic circuit 108 that cause transistors 60, 62, 94 and 96 to provide the coil current necessary to make coil 34 move head 12 from disk 14 to the ramp at the desired retract velocity. Furthermore, driver 26 uses coil 70 to control the motion of head 12 and coil 72 as a velocity transducer to provide continuous velocity feedback. In this manner, driver 26 functions as a closed loop linear velocity regulator. Advantageously, driver 26 provides accurate retract velocity control that reduces mechanical wear on the ramp, thereby increasing the lifetime of disk drive 10.

Disk drive 10 can include the single actuator arm 30 described above, or alternatively, multiple actuator arms 30 arranged in a comb-like fashion extending from the pivot point, with each actuator arm 30 supporting a separate head 12 that reads data from and writes data to a separate disk surface of disk or disks 14.

VCM 30 can include coils 70 and 72, or alternatively, the magnetic circuit can be shaved and a permanent magnetic/stationary part of VCM 30 can be used although an additional coil should be less costly than an additional magnet.

It will be apparent to those skilled in the art that various modifications and variations can be made in the driver without departing from the spirit or scope of the invention. Thus, it is intended that the present invention covers the modifications and variations of this invention provided that they come within the scope of the claims.

What is claimed is:

1. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, and the coil current flows through a coil in the voice coil motor, the driver comprising:
   a sensor that provides a sense current by sensing the coil current;
   a comparator that provides an error current by determining a difference between the command current and the sense current;
   an integrator that provides an integrated error current by integrating the error current; and
   an amplifier that provides the coil current by amplifying the integrated error current.

2. The driver of claim 1, wherein the sensor includes a sense resistor that provides a sense voltage in response to the coil current and a transconductance amplifier that provides the sense current in response to the sense voltage.

3. The driver of claim 1, wherein the coil includes first and second coils and a center tap, the amplifier includes first and second amplifiers, the first amplifier is coupled to the first coil, the second amplifier is coupled to the second coil and the first and second coils are coupled to one another at the center tap.

4. The driver of claim 3, wherein the first and second coils are coupled in series between the first and second amplifiers.

5. The driver of claim 4, wherein the first amplifier is coupled to the second coil and the center tap through the first coil, and the second amplifier is coupled to the first coil and the center tap through the second coil.

6. The driver of claim 1, wherein the integrator includes a capacitor.

7. The driver of claim 6, wherein the capacitor is coupled to a node between the comparator and the amplifier.

8. The driver of claim 7, wherein a resistor is coupled to the node by the capacitor, and the resistor provides a phase shift in the integrated error current that cancels a phase shift due to the voice coil motor.

9. The driver of claim 1, wherein the microprocessor sends a digital command to a digital-to-analog converter, the digital-to-analog converter provides an analog command in response to the digital command and the analog command provides the command current.

10. The driver of claim 1, wherein the microprocessor provides the command current in response to a host computer.

11. The driver of claim 1, wherein the microprocessor provides the command current in response to a servo operation.

12. The driver of claim 1, wherein the microprocessor provides the command current in response to a track following operation.

13. The driver of claim 1, wherein the microprocessor provides the command current in response to a retract operation.

14. A method for controlling a voice coil motor in the disk drive, wherein the disk drive includes a head, a disk and the voice coil motor, the head reads from and writes to the disk, the voice coil motor radially positions the head relative to the disk in response to a coil current, and the coil current flows through a coil in the voice coil motor, the method comprising:
   providing a command current that controls the voice coil motor;
   sensing the coil current to provide a sense current;
   comparing the command current and the sense current to provide an error current as a difference between the command current and the sense current;

integrating the error current to provide an integrated error current; and then amplifying the integrated error current to provide the coil current.

15. The method of claim 14, including providing the command current in response to a track following operation.

16. The method of claim 14, including sensing the coil current to provide a sense voltage and converting the sense voltage into the sense current.

17. The method of claim 14, including integrating the error current using a capacitor.

18. The method of claim 14, including amplifying the integrated error current using a class AB amplifier.

19. The method of claim 14, including amplifying the integrated error current using first and second amplifiers coupled to first and second coils in the voice coil motor.

20. The method of claim 14, including phase shifting the integrated error current using a resistor.

21. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, and the coil current flows through a coil in the voice coil motor, the driver comprising:

a sensor resistor that provides a sense voltage by sensing the coil current;

a transconductance amplifier that provides a sense current in response to the sense voltage;

a comparator that provides an error current by determining a difference between the command current and the sense current;

an integrator that provides an integrated error current by integrating the error current using a capacitor; and an amplifier that provides the coil current by amplifying the integrated error current.

22. The driver of claim 21, wherein the coil includes first and second coils and a center tap, the amplifier includes first and second amplifiers, the first amplifier is coupled to the first coil, the second amplifier is coupled to the second coil and the first and second coils are coupled to one another at the center tap.

23. The driver of claim 22, wherein the first and second coils are coupled in series between the first and second amplifiers.

24. The driver of claim 23, wherein the first amplifier is coupled to the second coil and the center tap through the first coil, and the second amplifier is coupled to the first coil and the center tap through the second coil.

25. The driver of claim 24, wherein the first amplifier is coupled to the first coil by a first terminal, the second amplifier is coupled to the second coil by a second terminal and the driver is coupled to the center tap by a third terminal.

26. The driver of claim 25, wherein an interface between the driver and the voice coil motor consists of the first, second and third terminals.

27. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor that provides a sense current by sensing the coil current;

a comparator that provides an error current by determining a difference between the command current and the sense current;

an integrator that provides an integrated error current by integrating the error current; and an amplifier that provides the coil current by amplifying the integrated error current, wherein the amplifier includes first and second amplifiers, the first amplifier is coupled to the first coil by a first terminal, the second amplifier is coupled to the second coil by a second terminal, the first amplifier is coupled to the second coil and the center tap through the first coil, the second amplifier is coupled to the first coil and the center tap through the second coil, the driver is coupled to the center tap by a third terminal, and an interface between the driver and the voice coil motor consists of the first, second and third terminals.

28. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor that provides a sense current by sensing the coil current;

a comparator that provides an error current by determining a difference between the command current and the sense current;

an integrator that provides an integrated error current by integrating the error current;

first and second amplifiers that provide the coil current by amplifying the integrated error current, wherein the first amplifier is coupled to the first coil, the second amplifier is coupled to the second coil, the first amplifier is coupled to the second coil and the center tap through the first coil, and the second amplifier is coupled to the first coil and the center tap through the second coil; and first and second transistors coupled to the center tap and coupled to the first and second coils through the center tap.

29. The driver of claim 28, wherein the first and second amplifiers send the coil current through the first and second coils in series, the first and second transistors are turned off and the center tap floats in response to a track following operation.

30. The driver of claim 29, wherein the first and second amplifiers operate as a class AB amplifier in response to the track following operation.

31. The driver of claim 28, wherein the first transistor sends the coil current through the center tap in a first direction, sends a first portion of the coil current through the first coil and sends a second portion of the coil current through the second coil, and the first and second amplifiers and the second transistor are turned off in response to a first seek operation that moves the head across the disk in a first radial direction.

32. The driver of claim 31, wherein the second transistor sends the coil current through the center tap in a second direction opposite the first direction, sends a first portion of the coil current through the first coil and sends a second portion of the coil current through the second coil, and the first and second amplifiers and the first transistor are turned off in response to a second seek operation that moves the head across the disk in a second radial direction opposite the first radial direction.

33. The driver of claim 32, wherein the coil current is independent of the integrated error current during the first and second seek operations.

34. The driver of claim 33, wherein the first transistor sends the coil current through the center tap in the first direction, sends a first portion of the coil current through the first coil and sends a second portion of the coil current through the second coil, the first and second amplifiers and the second transistor are turned off and the coil current is based on the integrated error current in response to a retract operation that moves the head across the disk in the first radial direction.

35. The driver of claim 28, wherein the first amplifier is coupled to the first coil by a first terminal, the second amplifier is coupled to the second coil by a second terminal, the first and second transistors are coupled to the center tap by a third terminal, and an interface between the driver and the voice coil motor consists of the first, second and third terminals.

36. A method for controlling a voice coil motor in the disk drive, wherein the disk drive includes a head, a disk and the voice coil motor, the head reads from and writes to the disk, the voice coil motor radially positions the head relative to the disk in response to a coil current, the coil current flows through a coil in the voice coil motor, the coil includes first and second coils and a center tap, and the first and second coils are coupled to one another at the center tap, the method comprising:

providing a command current that controls the voice coil motor;

sensing the coil current to provide a sense current;

comparing the command current and the sense current to provide an error current as a difference between the command current and the sense current;

integrating the error current to provide an integrated error current; then amplifying the integrated error current to provide the coil current; and sending the coil current through the first and second coils in series while the center tap floats.

37. The method of claim 36, including sending the coil current through the first and second coils in series while the center tap floats using a class AB amplifier.

38. The method of claim 36, including sending the coil current through the first and second coils in series while the center tap floats in response to a track following operation.

39. The method of claim 38, including sending the coil current through the center tap and through the first and second coils in parallel in response to a seek operation.

40. The method of claim 39, including sending the coil current through the first and second coils in parallel such that about one-half the coil current flows through the first coil and about one-half the coil current flows through the second coil in response to the seek operation.

41. The method of claim 39, including sending the coil current through the center tap and through the first and second coils in parallel using the integrated error current in response to a retract operation.

42. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor resistor that provides a sense voltage by sensing the coil current;

a transconductance amplifier that provides a sense current in response to the sense voltage;

a comparator that provides an error current by determining a difference between the command current and the sense current;

an integrator that provides an integrated error current by integrating the error current using a capacitor;

first and second amplifiers that provide the coil current by amplifying the integrated error current in response to a track following operation, wherein the first amplifier is coupled to the first coil, the second amplifier is coupled to the second coil, the first amplifier is coupled to the second coil and the center tap through the first coil, and the second amplifier is coupled to the first coil and the center tap through the second coil; and first and second transistors that provide the coil current independently of the integrated error current in response to first and second seek operations, wherein the first and second transistors are coupled to the center tap and coupled to the first and second coils through the center tap.

43. The driver of claim 42, wherein the first and second amplifiers operate as a class AB amplifier and send the coil current through the first and second coils in series, the first and second transistors are turned off and the center tap floats in response to the track following operation.

44. The driver of claim 42, wherein the first transistor sends the coil current through the center tap in a first direction and the first and second amplifiers and the second transistor are turned off in response to the first seek operation that moves the head across the disk in a first radial direction, and the second transistor sends the coil current through the center tap in a second direction opposite the first direction and the first and second amplifiers and the first transistor are turned off are turned off in response to the second seek operation that moves the head across the disk in a second radial direction opposite the first radial direction.

45. The driver of claim 42, wherein the first amplifier is coupled to the first coil by a first terminal, the second amplifier is coupled to the second coil by a second terminal, the first and second transistors are coupled to the center tap by a third terminal, and an interface between the driver and the voice coil motor consists of the first, second and third terminals.

46. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor that provides a sense current by sensing the coil current;

a comparator that provides an error current by determining a difference between the command current and the sense current;

an integrator that provides an integrated error current by integrating the error current;

first and second amplifiers that provide the coil current by amplifying the integrated error current in response to a track following operation, wherein the first amplifier is coupled to the first coil, the second amplifier is coupled to the second coil, the first amplifier is coupled to the second coil and the center tap through the first coil, and the second amplifier is coupled to the first coil and the center tap through the second coil; and first and second transistors coupled to the center tap and coupled to the first and second coils through the center tap that provide the coil current independently of the integrated error current in response to first and second seek operations, wherein the first and second amplifiers operate as a class AB amplifier and send the coil current through the first and second coils in series, the first and second transistors are turned off and the center tap floats in response to the track following operation, the first transistor sends the coil current through the center tap in a first direction and through the first and second coils in parallel to divide the coil current between the first and second coils and the first and second amplifiers and the second transistor are turned off in response to the first seek operation that moves the head across the disk in a first radial direction, and the second transistor sends the coil current through the center tap in a second direction opposite the first direction and through the first and second coils in parallel to divide the coil current between the first and second coils and the first and second amplifiers and the first transistor are turned off in response to the second seek operation that moves the head across the disk in a second radial direction opposite the first radial direction.

47. The driver of claim 46, wherein the first transistor is turned on and off using pulse width modulation that is active while the coil current is less than a threshold based on the command current and is inactive for a predetermined time period in response to the first seek operation, and the second transistor is turned on and off using pulse width modulation that is active while the coil current is less than the threshold and is inactive based for the predetermined time period in response to the second seek operation.

48. In a disk drive that includes a head, a disk, a microprocessor, a driver, a voice coil motor and a ramp, wherein the head reads from and writes to the disk, the microprocessor provides a command current to the driver, the driver provides a coil current to the voice coil motor in response to the command current, the voice coil motor radially positions the head relative to the disk in response to the coil current during a track following operation and retracts the head from the disk and loads the head on the ramp in response to the coil current during a retract operation, and the coil current flows through a coil in the voice coil motor, the driver comprising:

a sensor that provides a sense current sensing the coil current;

a comparator that provides an error current by determining a difference between the command current and the sense current;

an integrator that provides an integrated error current by integrating the error current;

an amplifier that provides the coil current by amplifying the integrated error current in response to the track following operation; and a transistor that provides the coil current based on the integrated error current in response to the retract operation.

49. The driver of claim 48, wherein the sensor includes a sense resistor that provides a sense voltage in response to the coil current and a transconductance amplifier that provides the sense current in response to the sense voltage.

50. The driver of claim 48, wherein the integrator includes a capacitor.

51. The driver of claim 48, wherein the coil includes first and second coils and a center tap, the amplifier includes first and second amplifiers, the first amplifier is coupled to the first coil, the second amplifier is coupled to the second coil, the first amplifier is coupled to the second coil and the center tap through the first coil, and the second amplifier is coupled to the first coil and the center tap through the second coil.

52. The driver of claim 51, wherein the transistor is coupled to the center tap and is coupled to the first and second coils through the center tap.

53. The driver of claim 52, wherein the first amplifier is coupled to the first coil by a first terminal, the second amplifier is coupled to the second coil by a second terminal, the transistor is coupled to the center tap by a third terminal, and an interface between the driver and the voice coil motor consists of the first, second and third terminals.

54. The driver of claim 48, wherein the amplifier provides the coil current independently of the transistor during the track following operation, and the transistor provides the coil current independently of the amplifier during the retract operation.

55. The driver of claim 48, wherein the transistor provides the coil current independently of the comparator and the integrator during a seek operation.

56. A method for controlling a voice coil motor in the disk drive, wherein the disk drive includes a head, a disk, a ramp and the voice coil motor, the head reads from and writes to the disk, the voice coil motor radially maintains the head relative to the disk in response to a coil current during a track following operation, the voice coil motor radially moves the head relative to the disk in response to the coil current during a seek operation, the voice coil motor retracts the head from the disk and loads the head on the ramp in response to the coil current during a retract operation, and the coil current flows through a coil in the voice coil motor, the method comprising:

providing a command current that controls the voice coil motor;

sensing the coil current to provide a sense current;

comparing the command current and the sense current to provide an error current as a difference between the command current and the sense current;

integrating the error current to provide an integrated error current;

providing the coil current using the integrated error current in response to the track following operation;

providing the coil current using the integrated current in response to the retract operation; and providing the coil current without using the integrated error current in response to the seek operation.

57. The method of claim 56, including sensing the coil current to provide a sense voltage and converting the sense voltage into the sense current.

58. The method of claim 56, including integrating the error current using a capacitor.

59. The method of claim 56, including performing the track following and seek operations in response to a servo operation.

60. The method of claim 56, including performing the retract operation in response to powering down the disk drive.

61. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:
- a sensor that provides a sense current by sensing the coil current;
- a comparator that provides an error current by determining a difference between the command current and the sense current;
- an integrator that provides an integrated error current by integrating the error current;
- an amplifier that provides the coil current through the first and second coils in series while the center tap floats by amplifying the integrated error current in response to a track following operation; and
- a transistor that provides the coil current through the center tap such that the coil current is divided between and flows in parallel through the first and second coils in response to a seek operation.

62. The driver of claim 61, wherein the amplifier operates as a class AB amplifier during the track following operation.

63. The driver of claim 61, wherein the transistor operates as a saturated bore transistor during the seek operation.

64. The driver of claim 61, wherein the amplifier is turned off during the seek operation.

65. The driver of claim 61, wherein the transistor is turned off during the track following operation.

66. The driver of claim 61, wherein the first and second coils provide opposing rotational forces in opposite rotational directions during the track following operation.

67. The driver of claim 61, wherein the first and second coils provide additive rotational forces in the same rotational direction during the seek operation.

68. The driver of claim 61, wherein the coil current is divided between the first and second coils during the seek operation such that about one-half the coil current flows through the first coil and about one-half the coil current flows through the second coil.

69. The driver of claim 61, wherein the transistor provides the coil current without using the integrated error current in response to the seek operation, and the transistor provides the coil current using the integrated error current in response to a retract operation.

70. The driver of claim 61, wherein the amplifier is coupled to the first coil by a first terminal, the amplifier is coupled to the second coil by a second terminal, the transistor is coupled to the center tap by a third terminal, and an interface between the driver and the voice coil motor consists of the first, second and third terminals.

71. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:
- a sensor resistor that provides a sense voltage by sensing the coil current;
- a transconductance amplifier that provides a sense current in response to the sense voltage;
- a comparator that provides an error current by determining a difference between the command current and the sense current;
- an integrator that provides an integrated error current by integrating the error current using a capacitor;
- an amplifier that provides the coil current through the first and second coils in series while the center tap floats by amplifying the integrated error current in response to a track following operation; and
- a transistor that provides the coil current through the center tap such that the coil current is divided between and flows in parallel through the first and second coils in response to a seek operation.

72. The driver of claim 71, wherein the amplifier operates as a class AB amplifier during the track following operation.

73. The driver of claim 71, wherein the transistor operates as a saturated bore transistor during the seek operation.

74. The driver of claim 71, wherein the amplifier is turned off during the seek operation.

75. The driver of claim 71, wherein the transistor is turned off during the track following operation.

76. The driver of claim 71, wherein the coils provide opposing rotational forces in opposite rotational directions during the track following operation.

77. The driver of claim 71, wherein the coils provide additive rotational forces in the same rotational direction during the seek operation.

78. The driver of claim 71, wherein the coil current is divided between the first and second coils during the seek operation such that about one-half the coil current flows through the first coil and about one-half the coil current flows through the second coil.

79. The driver of claim 71, wherein the transistor provides the coil current without using the integrated error current in response to the seek operation, and the transistor provides the coil current using the integrated error current in response to a retract operation.

80. The driver of claim 71, wherein the amplifier is coupled to the first coil by a first terminal, the amplifier is coupled to the second coil by a second terminal, the transistor is coupled to the center tap by a third terminal, and an interface between the driver and the voice coil motor consists of the first, second and third terminals.

81. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor that provides a sense current by sensing the coil current;

a comparator that provides an error current by determining a difference between the command current and the sense current;

an integrator that provides an integrated error current by integrating the error current;

an amplifier that provides the coil current through the first and second coils in series while the center tap floats by amplifying the integrated error current in response to a track following operation, wherein the amplifier includes first and second amplifiers, the first amplifier is coupled to the first coil, the second amplifier is coupled to the second coil, the first amplifier is coupled to the second coil and the center tap through the first coil, and the second amplifier is coupled to the first coil and the center tap through the second coil; and a transistor that provides the coil current through the center tap independently of the comparator and the integrator such that the coil current is divided between and flows in parallel through the first and second coils in response to a seek operation.

82. The driver of claim 81, wherein the amplifier operates as a class AB amplifier during the track following operation and is turned off during the seek operation, and the transistor operates as a saturated bore transistor during the seek operation and is turned off during the track following operation.

83. The driver of claim 81, wherein the coils provide opposing rotational forces in opposite rotational directions during the track following operation and provide additive rotational forces in the same rotational direction during the seek operation.

84. The driver of claim 81, wherein the transistor provides the coil current using the integrated error current in response to a retract operation in which the head is retracted from the disk and loaded on a ramp.

85. The driver of claim 81, wherein the first amplifier is coupled to the first coil by a first terminal, the second amplifier is coupled to the second coil by a second terminal, the transistor is coupled to the center tap by a third terminal, and an interface between the driver and the voice coil motor consists of the first, second and third terminals.

86. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor resistor that provides a sense voltage by sensing the coil current;

a transconductance amplifier that provides a sense current in response to the sense voltage;

a comparator that provides an error current by determining a difference between the command current and the sense current;

an integrator that provides an integrated error current by integrating the error current using a capacitor;

an amplifier that provides the coil current through the first and second coils in series while the center tap floats by amplifying the integrated error current in response to a track following operation, wherein the amplifier includes first and second amplifiers, the first amplifier is coupled to the first coil, the second amplifier is coupled to the second coil, the first amplifier is coupled to the second coil and the center tap through the first coil, and the second amplifier is coupled to the first coil and the center tap through the second coil; and a transistor that provides the coil current through the center tap independently of the comparator and the integrator such that the coil current is divided between and flows in parallel through the first and second coils in response to a seek operation.

87. The driver of claim 86, wherein the amplifier operates as a class AB amplifier during the track following operation and is turned off during the seek operation, and the transistor operates as a saturated bore transistor during the seek operation and is turned off during the track following operation.

88. The driver of claim 86, wherein the coils provide opposing rotational forces in opposite rotational directions during the track following operation and provide additive rotational forces in the same rotational direction during the seek operation.

89. The driver of claim 86, wherein the transistor provides the coil current using the integrated error current in response to a retract operation in which the head is retracted from the disk and loaded on a ramp.

90. The driver of claim 86, wherein the first amplifier is coupled to the first coil by a first terminal, the second amplifier is coupled to the second coil by a second terminal, the transistor is coupled to the center tap by a third terminal, and an interface between the driver and the voice coil motor consists of the first, second and third terminals.

91. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor that provides a sense current by sensing the coil current;

a comparator that provides an error current by determining a difference between the command current and the sense current;

an integrator that provides an integrated error current by integrating the error current;

an amplifier that provides the coil current through the first and second coils in series while the center tap floats by amplifying the integrated error current in response to a track following operation, wherein the amplifier includes first and second amplifiers, the first amplifier is coupled to the first coil, the second amplifier is coupled to the second coil, the first amplifier is coupled to the second coil and the center tap through the first coil, and the second amplifier is coupled to the first coil and the center tap through the second coil; and a transistor that provides the coil current through the center tap independently of the comparator and the integrator such that the coil current is divided between and flows in parallel through the first and second coils in response to a seek operation;

wherein the driver includes an integrated circuit chip, and the comparator, the amplifier and the transistor are internal to the chip.

92. The driver of claim 91, wherein the amplifier operates as a class AB amplifier during the track following operation and is turned off during the seek operation, and the transistor operates as a saturated bore transistor during the seek operation and is turned off during the track following operation.

93. The driver of claim 91, wherein the coils provide opposing rotational forces in opposite rotational directions during the track following operation and provide additive rotational forces in the same rotational direction during the seek operation.

94. The driver of claim 91, wherein the transistor provides the coil current using the integrated error current in response to a retract operation in which the head is retracted from the disk and loaded on a ramp.

95. The driver of claim 91, wherein the first amplifier is coupled to the first coil by a first terminal, the second amplifier is coupled to the second coil by a second terminal, the transistor is coupled to the center tap by a third terminal, and an interface between the driver and the voice coil motor consists of the first, second and third terminals.

96. In a disk drive that includes a head, a disk, a microprocessor, a driver and a voice coil motor, wherein the head reads from and writes to the disk, the microprocessor provides a command current to the driver, the driver provides a coil current to the voice coil motor in response to the command current, the voice coil motor radially positions the head relative to the disk in response to the coil current, the coil current flows through a coil in the voice coil motor, the coil includes first and second coils and a center tap, and the first and second coils are coupled to one another at the center tap, the driver comprising:

a sensor resistor that provides a sense voltage by sensing the coil current;

a transconductance amplifier that provides a sense current in response to the sense voltage;

a comparator that provides an error current by determining a difference between the command current and the sense current;

an integrator that provides an integrated error current by integrating the error current using a capacitor;

an amplifier that provides the coil current through the first and second coils in series while the center tap floats by amplifying the integrated error current in response to a track following operation, wherein the amplifier includes first and second amplifiers, the first amplifier is coupled to the first coil, the second amplifier is coupled to the second coil, the first amplifier is coupled to the second coil and the center tap through the first coil, and the second amplifier is coupled to the first coil and the center tap through the second coil; and a transistor that provides the coil current through the center tap independently of the comparator and the integrator such that the coil current is divided between and flows in parallel through the first and second coils in response to a seek operation;

wherein the driver includes an integrated circuit chip, the transconductance amplifier, the comparator, the amplifier and the transistor are internal to the chip and the sense resistor and the capacitor are external to the chip.

97. The driver of claim 96, wherein the amplifier operates as a class AB amplifier during the track following operation and is turned off during the seek operation, and the transistor operates as a saturated bore transistor during the seek operation and is turned off during the track following operation.

98. The driver of claim 96, wherein the coils provide opposing rotational forces in opposite rotational directions during the track following operation and provide additive rotational forces in the same rotational direction during the seek operation.

99. The driver of claim 96, wherein the transistor provides the coil current using the integrated error current in response to a retract operation in which the head is retracted from the disk and loaded on a ramp.

100. The driver of claim 96, wherein the first amplifier is coupled to the first coil by a first terminal, the second amplifier is coupled to the second coil by a second terminal, the transistor is coupled to the center tap by a third terminal, and an interface between the driver and the voice coil motor consists of the first, second and third terminals.

* * * * *